US011537809B2

(12) United States Patent
Gan et al.

(10) Patent No.: US 11,537,809 B2
(45) Date of Patent: Dec. 27, 2022

(54) DYNAMIC CONTAINER GROUPING (71) Applicant: KYNDRYL, INC., New York, NY (US)

(72) Inventors: Seng Chai Gan, Ashburn, VA (US); Shikhar Kwatra, Durham, NC (US); Michael Treadway, Keller, TX (US)

(73) Assignee: Kyndryl, Inc., New York, NY (US)

( * ) Notice: Subject to any disclaimer, the term of this patent is extended or adjusted under 35 U.S.C. 154(b) by 575 days.

(21) Appl. No.: 16/690,638

(22) Filed: Nov. 21, 2019

(65) Prior Publication Data

US 2021/0158083 A1 May 27, 2021

(51) Int. Cl.
*G06K 9/62* (2022.01)
*G06N 3/08* (2006.01)
(Continued)

(52) U.S. Cl.
CPC .......... *G06K 9/6223* (2013.01); *G06F 9/455* (2013.01); *G06F 9/45558* (2013.01); *G06N 3/02* (2013.01);
(Continued)

(58) Field of Classification Search
CPC .... G06K 9/6223; G06K 9/6276; G06F 9/455; G06F 9/45558; G06F 2009/4557;
(Continued)

(56) References Cited

U.S. PATENT DOCUMENTS 7,051,188 B1 5/2006 Kubala
7,284,054 B2 10/2007 Radhakrishnan
(Continued)

FOREIGN PATENT DOCUMENTS

AU 2020378003 A1 * 6/2022 ............ B25J 9/1658
CN 105247826 A * 1/2016 ............... G06F 9/50
(Continued)

OTHER PUBLICATIONS

"Cloud Orchestration Market by Service Type & Application—Global Forecast 2021", Markets and Markets, accessed Aug. 30, 2019, 8 pages, <https://www.marketsandmarkets.com/Market-Reports/cloud-orchestration-market-121240924.html?gclid=EAlaIQobChMIufvozqT04QIVVJ7ACh2tNwnGEAAYAiAAEgJDvPD_BwE>.

(Continued)

*Primary Examiner* — David R Lazaro
*Assistant Examiner* — Berhanu Shitayewoldetadik
(74) *Attorney, Agent, or Firm* — John Kennel; Matthew M. Hulihan; Heslin Rothenberg Farley & Mesiti PC (57) ABSTRACT

In an approach for optimally grouping containers, a processor passively monitors a set of parameters for a set of containers within a network. A processor records the set of parameters for each container of the set of containers. A processor deploys a k-nearest neighbor neural network (KNN) to determine a first set of groupings of the set of containers based on the set of parameters. A processor simulates the network having grouped containers based on the first set of groupings of the set of containers output by the KNN. A processor simulates an action on the set of containers. A processor updates a reward function based on the action. A processor determines whether a maximum value of the reward function is reached.

20 Claims, 3 Drawing Sheets

(51) Int. Cl.
  *G06F 9/455* (2018.01)
  *G06F 15/16* (2006.01)
  *H04L 15/16* (2006.01)
  *H04L 67/10* (2022.01)
  *H04L 9/40* (2022.01)
  *G06N 3/02* (2006.01)

(52) U.S. Cl.
  CPC ....... *G06N 3/08* (2013.01); *G06F 2009/4557* (2013.01); *G06F 2009/45595* (2013.01)

(58) Field of Classification Search
  CPC .. G06F 2009/45595; G06N 3/02; G06N 3/08; G06N 3/0454
  USPC .......................................................... 709/226
  See application file for complete search history.

(56) References Cited

U.S. PATENT DOCUMENTS

| | | | |
|---|---|---|---|
| 8,104,041 | B2 | 1/2012 | Belady |
| 8,132,180 | B2 | 3/2012 | Agarwal |
| 8,171,481 | B2 | 5/2012 | Benedetti et al. |
| 8,214,843 | B2 | 7/2012 | Boss |
| 9,256,467 | B1 | 2/2016 | Singh et al. |
| 9,391,922 | B2 | 7/2016 | Herington |
| 9,450,838 | B2 | 9/2016 | Jain |
| 9,563,480 | B2 | 2/2017 | Messerli |
| 9,674,042 | B2 | 6/2017 | Lissack |
| 9,715,408 | B2 | 7/2017 | Dube |
| 9,772,792 | B1 | 9/2017 | Wallner |
| 10,313,178 | B2 | 6/2019 | Kumar |
| 10,318,314 | B2 | 6/2019 | Kumar |
| 10,915,369 | B2* | 2/2021 | Wang ...................... H04L 47/78 |
| 10,936,717 | B1* | 3/2021 | Herman Saffar ... H04L 63/1408 |
| 2008/0298230 | A1 | 12/2008 | Luft |
| 2009/0172666 | A1* | 7/2009 | Yahalom ................. G06F 3/067 718/1 |
| 2011/0167096 | A1* | 7/2011 | Guo ........................ G06F 3/067 711/E12.002 |
| 2013/0124401 | A1 | 5/2013 | Del Real |
| 2016/0155048 | A1* | 6/2016 | McCormick ............ G06N 3/04 706/27 |
| 2016/0221765 | A1* | 8/2016 | Joehren ................ B65G 47/846 |
| 2016/0359680 | A1* | 12/2016 | Parandehgheibi ...... H04L 43/12 |
| 2017/0083175 | A1* | 3/2017 | Layman ............. G06F 3/04842 |
| 2017/0083386 | A1* | 3/2017 | Wing ........................ G06F 1/30 |
| 2017/0177323 | A1* | 6/2017 | Baset ...................... G06F 8/656 |
| 2018/0007178 | A1* | 1/2018 | Subhraveti ............. G06F 9/541 |
| 2018/0225589 | A1* | 8/2018 | Ghavamzadeh ....... G06N 20/00 |
| 2018/0300653 | A1* | 10/2018 | Srinivasan ............. H04L 67/06 |
| 2018/0302283 | A1* | 10/2018 | Vyas ................... G06F 9/45533 |
| 2018/0336079 | A1 | 11/2018 | Soman |
| 2018/0349168 | A1* | 12/2018 | Ahmed ............... G06F 9/45558 |
| 2019/0050272 | A1* | 2/2019 | Liu .................... G06F 9/45558 |
| 2019/0286994 | A1* | 9/2019 | Bhoj .................. H04L 43/0805 |
| 2019/0286995 | A1* | 9/2019 | Robinson ............. G06Q 10/063 |
| 2019/0287003 | A1* | 9/2019 | Sercinoglu ............ G06N 20/00 |
| 2019/0288927 | A1* | 9/2019 | Peng ...................... H04L 67/52 |
| 2019/0294983 | A1* | 9/2019 | Rahnama ............... G06N 20/00 |
| 2019/0318240 | A1* | 10/2019 | Kulkarni ................ H04L 67/34 |
| 2019/0340707 | A1* | 11/2019 | Cella ..................... G06F 9/4806 |
| 2019/0340715 | A1* | 11/2019 | Cella ........................ G06N 3/08 |
| 2019/0347121 | A1* | 11/2019 | Luo ........................ G06F 9/542 |
| 2019/0378052 | A1* | 12/2019 | Badhwar ............... G06N 20/00 |
| 2020/0051017 | A1* | 2/2020 | Dujmic ................. G06V 10/454 |
| 2020/0112487 | A1* | 4/2020 | Inamdar ................. H04L 67/14 |
| 2020/0134564 | A1* | 4/2020 | Reilly .................... G06F 9/5005 |
| 2020/0167199 | A1* | 5/2020 | Zur ........................ G06F 9/5011 |
| 2020/0167437 | A1* | 5/2020 | Mallya Kasaragod ..................... G06N 3/006 |
| 2020/0167687 | A1* | 5/2020 | Genc ...................... G06F 30/20 |
| 2020/0174842 | A1* | 6/2020 | Wang ...................... H04L 67/63 |
| 2020/0241863 | A1* | 7/2020 | Duvur ...................... G06F 8/65 |
| 2020/0250006 | A1* | 8/2020 | Parekh ................. H04L 67/1008 |
| 2020/0322226 | A1* | 10/2020 | Mishra .................. H04L 41/0895 |
| 2020/0334217 | A1* | 10/2020 | Soini .................... G06N 20/00 |
| 2020/0401852 | A1* | 12/2020 | Fan ........................ G06N 3/08 |
| 2021/0019528 | A1* | 1/2021 | Ghadyali .............. G06T 7/0004 |
| 2021/0048998 | A1* | 2/2021 | Myers ...................... G06F 8/65 |
| 2021/0089361 | A1* | 3/2021 | Rafey ................. G06F 9/45558 |
| 2021/0133085 | A1* | 5/2021 | Myers .................... G06F 17/11 |
| 2021/0133670 | A1* | 5/2021 | Cella ........................ G06N 5/04 |
| 2021/0141623 | A1* | 5/2021 | Bequet ................ G06N 3/0454 |
| 2021/0182996 | A1* | 6/2021 | Cella ................. G06Q 30/0202 |
| 2021/0195206 | A1* | 6/2021 | Hannuksela ........... H04N 19/30 |
| 2021/0357959 | A1* | 11/2021 | Cella ................. G06Q 10/0631 |
| 2022/0051778 | A1* | 2/2022 | Kühni ...................... G06N 3/08 |
| 2022/0130493 | A1* | 4/2022 | Turner ................... G16H 70/40 |
| 2022/0171863 | A1* | 6/2022 | Green ..................... G06F 21/31 |

FOREIGN PATENT DOCUMENTS

| | | | | |
|---|---|---|---|---|
| CN | 110119620 A | * | 8/2019 | ............. G06F 21/56 |
| EP | 3534310 A1 | * | 9/2019 | ......... G01F 23/2962 |

OTHER PUBLICATIONS

Gan et al., "Automated Virtual Machine Integrity Checks", U.S. Appl. No. 15/984,142, filed May 18, 2018, 65 pages.
Paraiso et al., "Model-Driven Management of Docker Containers," 2016 IEEE 9th International Conference on Cloud Computing (CLOUD), San Francisco, CA, 2016, pp. 718-725.
Red Hat, "Fleet Documentation, Deprecated functionality", Coreos, Accessed Aug. 7, 2019, 3 pages, <https://coreos.com/fleet/docs/latest/deprecated-features.html>.
Souppaya et al., "Application Container Security Guide," NIST Special Publication 800-190, Sep. 2017, 63 pages, <https://doi.org/10.6028/NIST.SP.800-190>.

* cited by examiner

DYNAMIC CONTAINER GROUPING

BACKGROUND

The present invention relates generally to the field of containers, and more particularly to dynamic container grouping.

A container is a standard unit of software that packages up code and all its dependencies so that an application runs quickly and reliably from one computing environment to another. Containers isolate software from its environment and ensure that it works uniformly despite differences for instance between development and staging.

Container orchestration platforms allow users to configure specific rulesets around how containers are scheduled and placed on underlying worker nodes. These rules require prior knowledge of the relationships between various applications.

SUMMARY

Aspects of an embodiment of the present invention disclose a method, computer program product, and computer system for dynamic container grouping. A processor passively monitors a set of parameters for a set of containers within a network. A processor records the set of parameters for each container of the set of containers. A processor deploys a k-nearest neighbor neural network (KNN) to determine a first set of groupings of the set of containers based on the set of parameters. A processor simulates the network having grouped containers based on the first set of groupings of the set of containers output by the KNN. A processor simulates an action on the set of containers. A processor updates a reward function based on the action. A processor determines whether a maximum value of the reward function is reached.

DETAILED DESCRIPTION

Embodiments of the present invention recognize that container orchestration platforms, i.e., KUBERNETES®, allow users to configure specific rulesets around how containers are scheduled and placed on underlying worker nodes (i.e., servers). These rules require prior knowledge of the relationships between various containers. Those relationships may not result in the most optimal container scheduling and require a combination of monitoring and trial and error to achieve an optimal distribution on worker nodes.

Automatic re-distribution is supported by numerous platforms based on simple metrics, i.e., memory or central processing unit (CPU) utilization of a particular worker node. These known automatic re-distribution algorithms work to re-balance loads across worker nodes to reduce costs and latency but do so with no regard for application performance and energy costs. Embodiments of the present invention recognize the usefulness for a cloud service provider of grouping containers that are executing at the same time. The group of containers can be allocated or re-balanced across CPUs to improve performance, efficiency, or both. Container orchestration platforms may group containers from multiple customers in order to improve efficiency.

Additionally, some current methods place an agent (i.e., a software agent of the cloud service provider) inside a container to track when the container has workloads and/or communicates with other containers. The main problem with this method is that many customers of a cloud service provider do not want this agent inside their containers for data security reasons. Customers do not want the container orchestration platform and ultimately the cloud service provider to know what exactly the software is that is running in the container. Embodiments of the present invention require no modifications to the containers and require no agent inside the containers. Embodiments of the present invention can also be applied to a virtual machine (VM)/hypervisor system.

Embodiments of the present invention provide the discovery of container groupings by passive network observation or behavioral observation. The grouping of containers is based on container communications with each other; execution times, i.e., containers that execute in the same time period interval, e.g., 100 ms, 1 s; and periodicity, i.e., containers that execute at the same time of day, same day of the week, or same day of the month. Embodiments of the present invention utilize a network monitoring system to passively monitor the containers in the system. Embodiments of the present invention provide dynamic grouping of containers by passive network monitoring using a reinforcement learning module and a k-nearest neighbor neural network (KNN).

Embodiments of the present invention utilize container groups to provide balanced performance and efficiency. Efficiency is improved by spreading a group of containers among the least amount of worker nodes in a local cluster, and performance is improved by spreading a group of containers to more worker nodes across multiple clusters. Embodiments of the present invention spread the group of containers to a determined number of servers that provide a balance between performance and efficiency.

Embodiments of the present invention can be utilized to maximize power savings using container grouping. In an example embodiment with group A of 32 containers and group B of 32 containers, embodiments of the present invention discover the 32 containers in group A and group B run at the same time. In order to maximize power savings, the two groups are not intermixed, but embodiments of the present invention re-balance and/or allocate group A into a first server and group B into a second server. By grouping the containers on separate servers, the servers are more likely to have idle time and consume less power.

Embodiments of the present invention can also be utilized to maximize power and hardware savings using container grouping. In an example embodiment with group A of 32 containers and group B of 32 containers, embodiments of the present invention discover that group A only runs on odd days and group B only runs on even days. Because the two groups do not run on the same days, embodiments of the present invention re-balance and/or allocate both group A and group B into the same server. The server can be oversubscribed with minimum impact to container performance in order to save power and hardware.

Embodiments of the present invention can also be utilized to provide a balance between container performance and hardware/power efficiency using container grouping. In an example embodiment with group A of 32 containers and group B of 32 containers, embodiments of the present invention discover that group A only runs on odd days and group B only runs on even days. Embodiments of the present invention utilize a reinforcement learning module and KNN to determine a number of servers to split the groups into. In this example, embodiments of the present invention determine to put 16 containers of group A and 16 containers of group B into a first server.

The present invention will now be described in detail with reference to the Figures.

Figure 1:
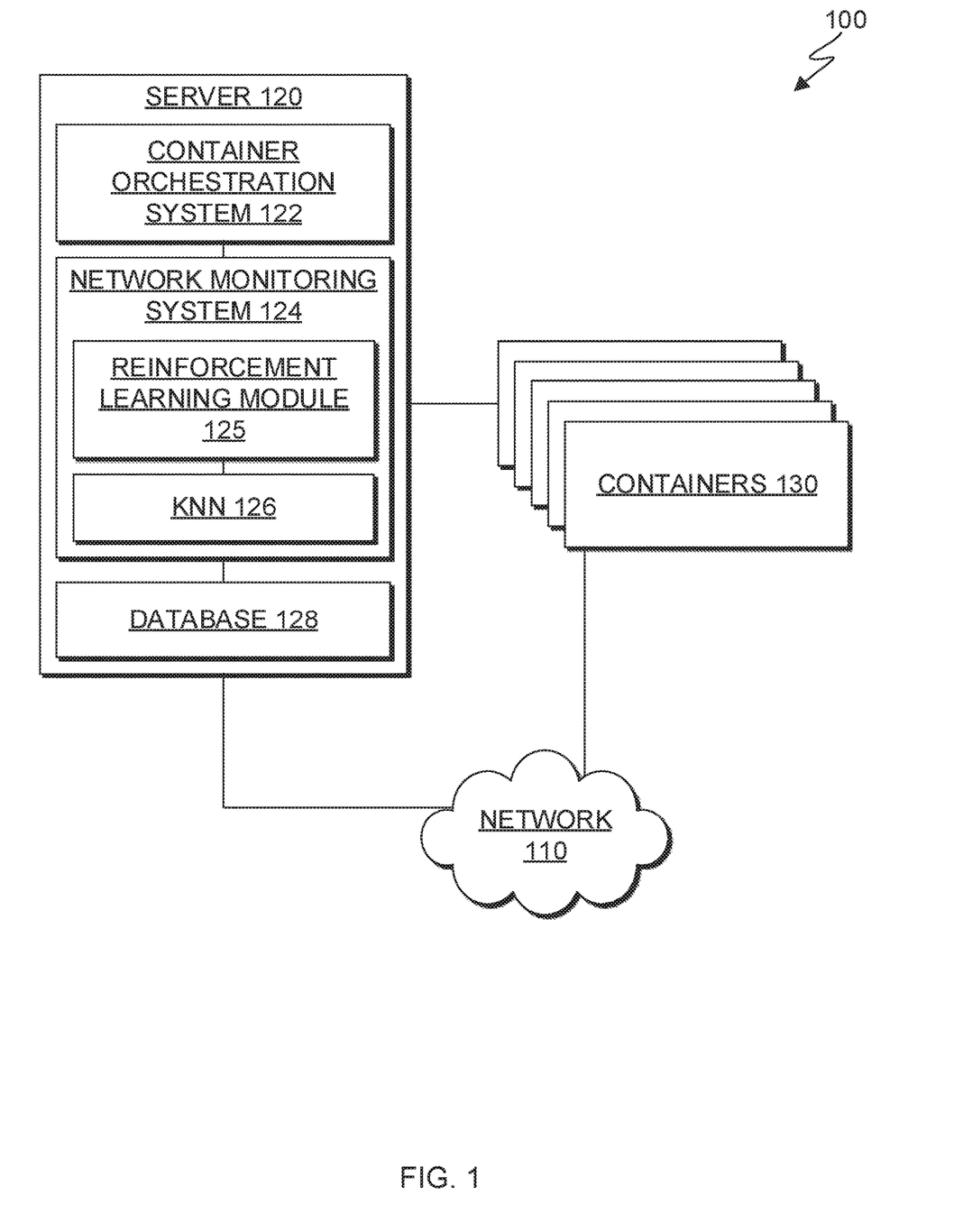
FIG. 1 depicts a block diagram of a distributed data processing environment, in accordance with an embodiment of the present invention.

FIG. 1 depicts a functional block diagram illustrating distributed data processing environment 100, in accordance with an embodiment of the present invention. FIG. 1 provides only an illustration of one embodiment of the present invention and does not imply any limitations with regard to the environments in which different embodiments may be implemented. In the depicted embodiment, distributed data processing environment 100 includes server 120 and containers 130 interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server 120 and containers 130. Distributed data processing environment 100 may include additional servers, computers, or other devices not shown.

Server 120 operates to run container orchestration system 122, run network monitoring system 124, and store and/or send data using database 128. In the depicted embodiment, server 120 houses container orchestration system 122, network monitoring system 124, and database 128. In some embodiments, server 120 may be a management server, a web server, or any other electronic device or computing system capable of receiving and sending data. In some embodiments, server 120 may be a laptop computer, tablet computer, netbook computer, personal computer (PC), a desktop computer, a smart phone, or any programmable electronic device capable of communicating with containers 130 via network 110. In some embodiments, server 120 represents a server computing system utilizing multiple computers as a server system, such as in a cloud computing environment. In some embodiments (not shown), container orchestration system 122, network monitoring system 124, and database 128 may be housed on separate servers and/or computing devices provided that container orchestration system 122, network monitoring system 124, and database 128 have access to network 110. Server 120 may include components as described in further detail in FIG. 3.

Container orchestration system 122 operates to manage the lifecycles of containers, i.e., containers 130. In general, a container orchestration system controls and automates tasks including, but not limited to, provisioning and deployment of containers, redundancy and availability of containers, allocation of resources between containers, movement of containers across a host infrastructure, and load balancing between containers. In an embodiment, container orchestration system 122 is in communication with network monitoring system 124 and receives container groupings from network monitoring system 124. In an embodiment, container orchestration system 122 allocates a container, generates a unique identifier (e.g., checksum/id), and provides the unique identifier and internet protocol (IP) address for the container to network monitoring system 124. In the depicted embodiment, container orchestration system 122 resides on server 120. In other embodiments, container orchestration system 122 may reside on another computing device (not shown), provided that container orchestration system 122 has access to network 110.

Network monitoring system 124 operates to group containers for optimized efficiency and application performance by using a reinforcement learning module and a KNN. In an embodiment, network monitoring system 124 contains reinforcement learning module 125 and KNN 126. In other embodiments, reinforcement learning module 125 and/or KNN 126 may reside on another computing device (not shown), provided that reinforcement learning module 125 and/or KNN 126 have access to network 110. In the depicted embodiment, network monitoring system 124 resides on server 120. In other embodiments, network monitoring system 124 may reside on another computing device (not shown), provided that network monitoring system 124 has access to network 110.

In an embodiment, network monitoring system 124 passively monitors a set of containers within a network, e.g., containers 130 in network 110. In an embodiment, network monitoring system 124 passively monitors the traffic for containers 130, in which traffic includes communications between containers 130, and records the time of the communication and which containers are a part of the communication. Traffic does not include communications between containers 130 with network 110, container orchestration system 122, or server 120. In an embodiment, network monitoring system 124 utilizes the container communications to determine groupings of containers 130 by grouping containers that communicate with each other within the same time periods (e.g., 100 ms, 1 s, etc.). In an embodiment, network monitoring system 124 passively monitors the execution times of containers 130 and records the execution times. In an embodiment, network monitoring system 124 utilizes the executions times to group containers 130 based on their periodicity (e.g., grouping a set of containers based on the set executing on the same time of day, day of the week, or day of the month).

In an embodiment, reinforcement learning module 125 is used by network monitoring system 124 to optimize a reward function by training network monitoring system 124 to optimally group the containers, i.e., containers 130, taking into account state parameters in a given environment, i.e., distributed data processing environment 100. In general, reinforcement learning is an area of machine learning concerned with how one or more software agents ought to take actions in an environment so as to maximize some notion of cumulative reward. In an embodiment, reinforcement learning module 125 passively monitors containers 130 by tracking a set of parameters of each container of containers 130, in which the set of parameters include state, action, transition, and reward parameters. State parameters for a respective container include, but are not limited to, the unique identifier (e.g., checksum/id), IP address, server ID, current traffic (e.g., communications), and a periodicity count metric (e.g., time of day, week, or month). An action of a respective container may include, but is not limited to, grouping the container with other containers based on identifying the state parameters and helping the container transition from one group state to another. A reward is proportional to the immediate positive or negative value (i.e., reward or penalty value) assigned on a state transition when acted upon with a certain action by a software agent. In an embodiment, reinforcement learning module 125 utilizes one or more software agents that perform actions based on the state parameters to optimize the reward parameter.

In an embodiment, KNN 126 is used by network monitoring system 124 to initially group containers, e.g., containers 130, based on a centroid of the containers' distance in properties from each other, the type of task the containers are running, and the difference in network interaction between the containers based on network monitoring. Then, reinforcement learning module 125 is used as a feedback to take into account more state parameters as simulated actions are done to containers 130 and, in some embodiments, a user's predicted inputs, input through a user interface (not shown), to curate the grouping of said containers in an optimal fashion iteratively until the reward function is maximized.

Database 128 operates as a repository for data received, used, and/or output by container orchestration system 122 and/or network monitoring system 124. Data received, used, and/or generated by container orchestration system 122 may include, but is not limited to, unique identifiers of containers, IP addresses of containers, and groupings of containers. Data received, used, and/or generated by network monitoring system 124 may include, but is not limited to, a set of parameters for a container, communications between containers, groupings of containers, and a q-table utilized and updated by a deep Q network algorithm of reinforcement learning module 125. Database 128 can be implemented with any type of storage device capable of storing data and configuration files that can be accessed and utilized by server 120, such as a database server, a hard disk drive, or a flash memory. In an embodiment, database 128 is accessed by container orchestration system 122 and/or network monitoring system 124 to store and/or to access the data. In the depicted embodiment, database 128 resides on server 120. In another embodiment, database 128 may reside elsewhere within distributed data processing environment 100, provided that database 128 has access to network 110.

Containers 130 operates as packaged units of software for running an application that are managed by container orchestration system 122. Containers 130 may include containers from multiple customers of a cloud service provider. In an embodiment, containers 130 are grouped by container orchestration system 122 based on output received from network monitoring system 124. In an embodiment, containers 130 are running on hardware, i.e., servers, and/or VMs and can be moved by container orchestration system 122 between hardware and/or VMs based on the groupings output by network monitoring system 124.

Figure 2:
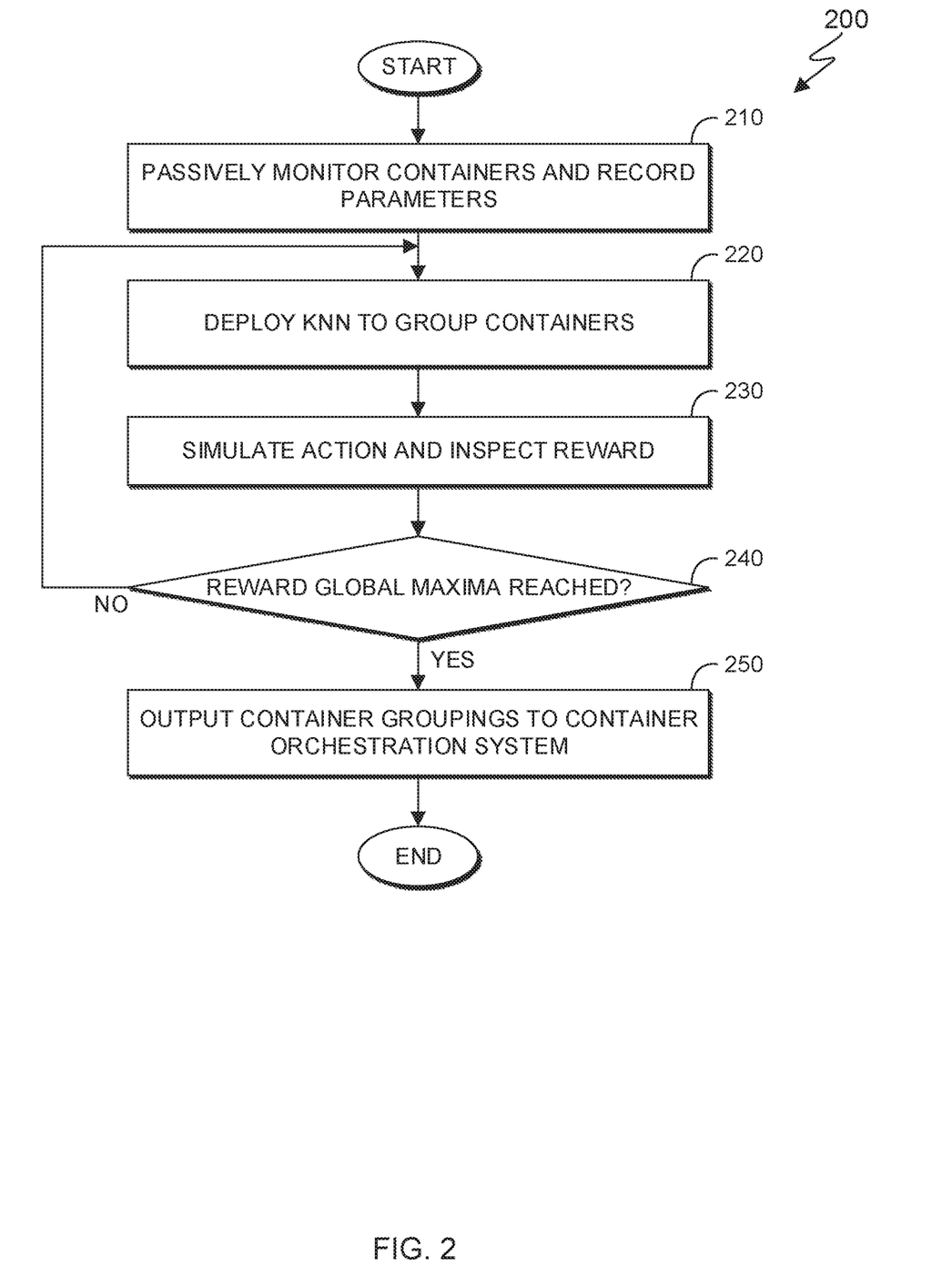
FIG. 2 depicts a flow chart of the steps of a network monitoring system, in accordance with an embodiment of the present invention.

FIG. 2 depicts a flowchart 200 of the steps of network monitoring system 124, in accordance with an embodiment of the present invention. In the depicted embodiment, network monitoring system 124 passively monitors parameters of containers within a network using a reinforcement learning module, inputs parameters into a KNN, receives container groupings output by the KNN, optimizes the container groupings until a maximum value of a reward function is reached, and outputs the optimal container groupings to a container orchestration system that re-organizes the containers on worker nodes based on the groupings.

In step 210, network monitoring system 124 passively monitors containers and records parameters. In an embodiment, network monitoring system 124 passively monitors the traffic for containers 130, in which traffic includes communications between containers 130. In an embodiment, network monitoring system 124 records the time of a communication and which containers are a part of the communication. In an embodiment, network monitoring system 124 passively monitors the execution times of containers 130. In an embodiment, network monitoring system 124 records the execution times of containers 130. In an embodiment, reinforcement learning module 125 passively monitors containers 130 by tracking a set of parameters of each container of containers 130, in which the set of parameters include state, action, transition, and reward parameters. State parameters for a respective container include, but are not limited to, the unique identifier (e.g., checksum/id), IP address, server ID, current traffic, and a periodicity count metric (e.g., time of day, week, or month).

In step 220, network monitoring system 124 deploys a KNN to determine groupings of containers. In a first iteration of an embodiment, network monitoring system 124 deploys KNN 126 to initially group containers, e.g., containers 130, based on a centroid of the containers' distance in properties from each other, the type of task the containers are running, and the difference in network interaction between the containers based on network monitoring. In an embodiment, KNN 126 groups containers based on parameters monitored by reinforcement learning module 125. In an embodiment, KNN 126 outputs groupings of containers 130 to reinforcement learning module 125 of network monitoring system 124.

In later iterations of an embodiment, network monitoring system 124 deploys KNN 126 to re-group containers 130. In a prior iteration, a software agent took an action to modify the parameters to re-group the containers but a global maximum value for the reward function was not reached, and so reinforcement learning module 125 feeds the modified parameters into KNN 126. In an embodiment, KNN 126 outputs the updated groupings of containers 130 to reinforcement learning module 125 of network monitoring system 124.

In step 230, network monitoring system 124 simulates an action and inspects a reward. In an embodiment, network monitoring system 124 simulates an environment of grouped containers based on KNN output. In an embodiment, a software agent of reinforcement learning module 125 acts upon a simulated environment to group containers 130 based on the groupings output by KNN 126. In an embodiment, a software agent of reinforcement learning module 125 initiates with a particular group from a group of randomly designated groups, $G=\{G_1, G_2, \ldots G_n\}$, and servers, $S=\{S_1, S_2, \ldots S_n\}$, containing varied container groups. In an embodiment, a software agent of reinforcement learning module 125 initiates with a particular group based on the current parameters. In an embodiment, a software agent of reinforcement learning module 125 initiates with a particular group or container based on an updated q-table of a deep Q network (DQN) algorithm used by reinforcement learning module 125 to optimize the group or container initiated with by the software agent to ultimately optimize the groupings of containers 130. In an embodiment, reinforcement learning module 125 utilizes the q-table stored in database 128.

In an embodiment, the action the software agent takes is also based on an updated q-table of a DQN algorithm used by reinforcement learning module 125 to optimize the action taken by the software agent to ultimately optimize the groupings of containers 130. For example, a software agent of reinforcement learning module 125 transfers a group $G_m$ to server $S_m$ and inspects the reward of the transition. In an embodiment, reinforcement learning module 125 of network monitoring system 124 allocates a positive value to the reward parameter if the overall servers are reduced from $\{S_1, S_2, \ldots S_n\}$ to $\{S_1, S_2, \ldots S_m\}$ where $S_m \ll S_n$, without affecting a performance factor pf of the containers. In an embodiment, reinforcement learning module 125 of network monitoring system 124 allocates a positive value to the reward parameter if the container groupings $G_1, G_2, \ldots G_n$ are distributed such that a performance factor is increased. In an embodiment, reinforcement learning module 125 of network monitoring system 124 allocates a negative value to the reward parameter if the container groupings $G_1, G_2, \ldots G_n$ are distributed such that the performance factor is decreased.

In an embodiment, the q-table is updated with the updated reward parameter and Q values for each container after every iteration. In an embodiment, reinforcement learning module 125 updates the q-table stored in database 128.

In decision 240, network monitoring system 124 determines whether global maxima for the reward parameters have been reached. In an embodiment, reinforcement learning module 125 determines whether the maximum value of the reward function based on the updated q-table and the iterations for optimally grouping the containers being completed. If network monitoring system 124 determines the global maxima for the reward parameter has not been reached (decision 240, NO branch), network monitoring system 124 returns to step 220 to reiterate steps 220 through 240. If network monitoring system 124 determines the global maxima for the reward parameter has been reached (decision 240, YES branch), network monitoring system 124 proceeds to step 250, in which network monitoring system 124 outputs the container groupings for containers 130 to container orchestration system 122.

In step 250, network monitoring system 124 outputs the container groupings for containers 130 to container orchestration system 122. In an embodiment, reinforcement learning module 125 outputs the container groupings for containers 130 to container orchestration system 122. In an embodiment, container orchestration system 122 moves containers 130 between servers and/or VMs based on the container groupings output by reinforcement learning module 125.

Figure 3:
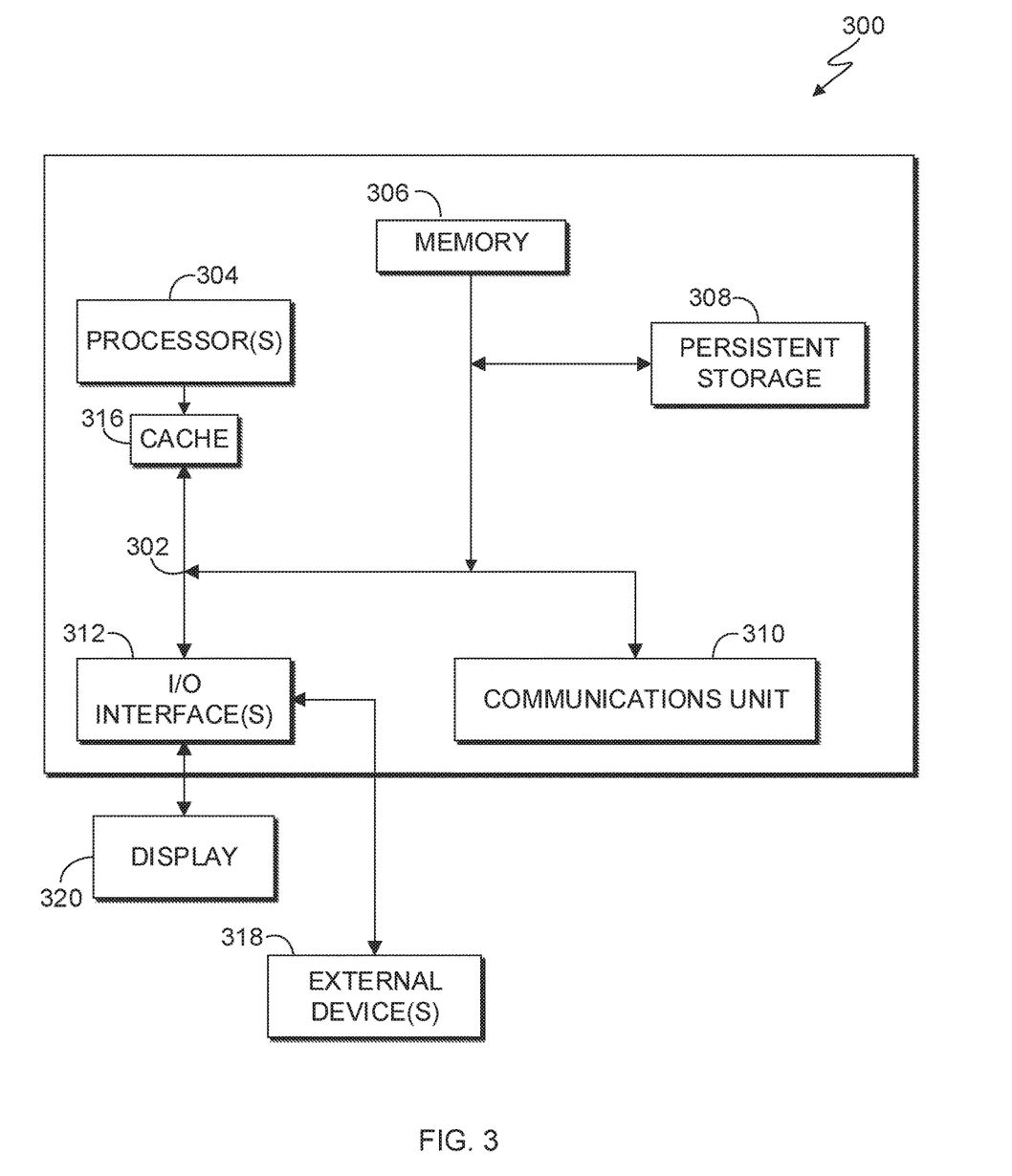
FIG. 3 depicts a block diagram of a computer of distributed data processing environment, in accordance with an embodiment of the present invention.

FIG. 3 depicts a block diagram of computer 300 suitable for server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for optimally grouping containers, the computer-implemented method comprising:
    passively monitoring, by one or more processors, a set of parameters for a set of containers within a network;
    recording, by one or more processors, the set of parameters for each container of the set of containers;
    deploying, by one or more processors, a k-nearest neighbor neural network (KNN) to determine a first set of groupings of the set of containers based on the set of parameters;

simulating, by one or more processors, the network having grouped containers based on the first set of groupings of the set of containers output by the KNN;

simulating, by one or more processors, an action on the set of containers;

updating, by one or more processors, a reward function based on the action; and determining, by one or more processors, whether a maximum value of the reward function is reached with a set of groupings of the set of containers, the set of groupings dictating a plurality of groups of the set of containers, wherein each group of the plurality of groups comprises a respective one or more containers, of the set of containers, to execute on a common one or more servers, and wherein the maximum value indicates that a maximum reward of execution of the set of containers within the network is obtained using that set of groupings.

2. The computer-implemented method of claim 1, further comprising:

responsive to determining that the maximum value of the reward function is reached, outputting, by one or more processors, a set of groupings of the set of containers that produced the maximum value of the reward function to a container orchestration system.

3. The computer-implemented method of claim 1, further comprising:

responsive to determining that the maximum value of the reward function was not reached, simulating, by one or more processors, a second action on the set of containers;

updating, by one or more processors, the reward function based on the second action; and determining, by one or more processors, whether the maximum value of the reward function is reached.

4. The computer-implemented method of claim 1, wherein the set of parameters include a set of state parameters, an action parameter, a transition parameter, and a reward parameter.

5. The computer-implemented method of claim 1, wherein the action is transferring a container from a first grouping to a second grouping.

6. The computer-implemented method of claim 1, further comprising:

recording, by one or more processors, execution times of the set of containers; and inputting, by one or more processors, the execution times of the set of containers into the KNN.

7. The computer-implemented method of claim 1, further comprising:

receiving, by one or more processors, the first set of groupings of the set of containers output by the KNN.

8. A computer program product for optimally grouping containers, the computer program product comprising:

one or more computer readable storage media and program instructions stored on the one or more computer readable storage media, the program instructions comprising:

program instructions to passively monitor a set of parameters of a set of containers within a network;

program instructions to record the set of parameters for each container of the set of containers;

program instructions to deploy a k-nearest neighbor neural network (KNN) to determine a first set of groupings of the set of containers based on the set of parameters;

program instructions to simulate the network having grouped containers based on the first set of groupings of the set of containers output by the KNN;

program instructions to simulate an action on the set of containers;

program instructions to update a reward function based on the action; and program instructions to determine whether a maximum value of the reward function is reached with a set of groupings of the set of containers, the set of groupings dictating a plurality of groups of the set of containers, wherein each group of the plurality of groups comprises a respective one or more containers, of the set of containers, to execute on a common one or more servers, and wherein the maximum value indicates that a maximum reward of execution of the set of containers within the network is obtained using that set of groupings.

9. The computer program product of claim 8, further comprising:

responsive to determining that the maximum value of the reward function is reached, program instructions to output a respective set of groupings of the set of containers that produced the maximum value of the reward function to a container orchestration system.

10. The computer program product of claim 8, further comprising:

responsive to determining that the maximum value of the reward function was not reached, program instructions to simulate a second action on the set of containers;

program instructions to update the reward function based on the second action; and program instructions to determine whether the maximum value of the reward function is reached.

11. The computer program product of claim 8, wherein the set of parameters include a set of state parameters, an action parameter, a transition parameter, and a reward parameter.

12. The computer program product of claim 8, wherein the action is transferring a container from a first grouping to a second grouping.

13. The computer program product of claim 8, further comprising:

program instructions to record execution times of the set of containers; and program instructions to input the execution times of the set of containers into the KNN.

14. The computer program product of claim 8, further comprising:

program instructions to receive the first set of groupings of the set of containers output by the KNN.

15. A computer system for optimally grouping containers, the computer system comprising:

one or more computer processors;

one or more computer readable storage media;

program instructions stored on the computer readable storage media for execution by at least one of the one or more processors, the program instructions comprising:

program instructions to passively monitor a set of parameters of a set of containers within a network;

program instructions to record the set of parameters for each container of the set of containers;

program instructions to deploy a k-nearest neighbor neural network (KNN) to determine a first set of groupings of the set of containers based on the set of parameters;

program instructions to simulate the network having grouped containers based on the first set of groupings of the set of containers output by the KNN;

program instructions to simulate an action on the set of containers;

program instructions to update a reward function based on the action; and program instructions to determine whether a maximum value of the reward function is reached with a set of groupings of the set of containers, the set of groupings dictating a plurality of groups of the set of containers, wherein each group of the plurality of groups comprises a respective one or more containers, of the set of containers, to execute on a common one or more servers, and wherein the maximum value indicates that a maximum reward of execution of the set of containers within the network is obtained using that set of groupings.

16. The computer system of claim 15, further comprising:
responsive to determining that the maximum value of the reward function is reached, program instructions to output a respective set of groupings of the set of containers that produced the maximum value of the reward function to a container orchestration system.

17. The computer system of claim 15, wherein the set of parameters include a set of state parameters, an action parameter, a transition parameter, and a reward parameter.

18. The computer system of claim 15, wherein the action is transferring a container from a first grouping to a second grouping.

19. The computer system of claim 15, further comprising:
program instructions to record execution times of the set of containers; and
program instructions to input the execution times of the set of containers into the KNN.

20. The computer system of claim 15, further comprising:
program instructions to receive the first set of groupings of the set of containers output by the KNN.

* * * * *